United States Patent
Zimmer et al.

(10) Patent No.: US 7,284,136 B2
(45) Date of Patent: Oct. 16, 2007

(54) METHODS AND APPARATUS FOR IMPLEMENTING A SECURE RESUME

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 277 days.

(21) Appl. No.: 10/349,604

(22) Filed: Jan. 23, 2003

(65) Prior Publication Data
US 2004/0148536 A1   Jul. 29, 2004

(51) Int. Cl.
*G06F 1/26* (2006.01)

(52) U.S. Cl. ............... 713/300; 713/1; 713/2; 713/161; 713/176

(58) Field of Classification Search .......... 713/1, 713/2, 161, 176
See application file for complete search history.

(56) References Cited

U.S. PATENT DOCUMENTS

| | | | | |
|---|---|---|---|---|
| 5,249,285 A | * | 9/1993 | Mueller et al. | 711/161 |
| 5,539,879 A | * | 7/1996 | Pearce et al. | 714/47 |
| 5,944,821 A | * | 8/1999 | Angelo | 726/22 |
| 6,081,752 A | * | 6/2000 | Benson et al. | 700/79 |
| 6,230,274 B1 | * | 5/2001 | Stevens et al. | 713/320 |
| 6,378,087 B1 | * | 4/2002 | Flanagan et al. | 714/38 |
| 6,389,556 B1 | * | 5/2002 | Qureshi | 714/15 |
| 6,510,528 B1 | * | 1/2003 | Freeman et al. | 714/6 |
| 6,615,355 B2 | * | 9/2003 | Mattison | 713/193 |
| 6,669,100 B1 | * | 12/2003 | Rogers et al. | 235/492 |
| 6,694,451 B2 | * | 2/2004 | Atkinson | 714/15 |
| 2001/0016927 A1 | * | 8/2001 | Poisner | 714/718 |
| 2003/0196137 A1 | * | 10/2003 | Ahmad et al. | 714/13 |

OTHER PUBLICATIONS

Compaq Computer Corporation et al. "Advanced Configuration And Power Interface Specification." Revision 2.0b, p. 214-217. Oct. 11, 2002.

* cited by examiner

*Primary Examiner*—Thomas Lee
*Assistant Examiner*—Vincent T Tran
(74) *Attorney, Agent, or Firm*—Hanley, Flight & Zimmerman, LLC

(57) ABSTRACT

Methods and apparatus for implementing a secure resume are disclosed. In an example, a method of securely resuming operation of a processor from a low power state to an active state includes detecting a resume event, calculating a metric of information stored in memory locations, wherein the information is used by the processor to resume operation from the low power state to the active state and comparing the calculated metric to a stored metric and resuming operation from the low power state to the active state if the calculated metric and the stored metric match.

9 Claims, 3 Drawing Sheets

METHODS AND APPARATUS FOR IMPLEMENTING A SECURE RESUME

TECHNICAL FIELD

The present disclosure pertains to computing systems and, more particularly, to methods and apparatus for implementing a secure resume.

BACKGROUND

Historically, computing systems were rather large and cumbersome devices that required power from an alternating current source, such as a 110 volt wall outlet, to operate. More recently, with the advent of miniaturized circuits, memories and processing devices, computing systems have dramatically increased their computing power density, meaning that more and more powerful computing devices are available in smaller and smaller form factors. While ten years ago a conventional computing device was constructed in a desktop or mainframe form factor, today much more powerful computing devices are available in notebook and even hand-held form factors.

As the form factors of computing devices have shrunk considerably and the portability of such devices has become desirable, it has become imperative that such devices be unteathered from conventional wall outlets. Accordingly, notebook computing devices routinely include batteries, which are charged by wall outlet power, that enable use of the notebook computing device for several hours without the need for wall outlet power. Similarly, hand-held devices such as personal digital assistants (PDAs) operate almost exclusively on batteries.

Battery life of computing devices has, therefore, become a major consideration. One significant power consumer in a computing device is the processor utilized by the device. To make the processor operate as efficiently as possible, many processors of computing devices include an Advanced Computer Power Interface (ACPI), which is a basic input/output system (BIOS)-based power management system. ACPI uses device activity timeouts to determine when to transition a processor into one or more low power, or sleep, states in which the processor consumes a reduced quantity of current.

For example, the ACPI specification defines five sleep states that are referred to as S1-S5. In nearly all of the sleep states, the processor, cache and chip set contexts are lost, but are restored by the processor upon exit of the sleep state by recalling information stored prior to entering the sleep state. In typical operation, after a pre-defined period of computing system inactivity the ACPI, which operates unbeknownst to the OS, cause the processor to go to sleep. Prior to entering sleep state, the OS writes to an ACPI non-volatile storage (NVS) memory, information such as code and data that the processor will need to restore state information upon awakening from the sleep state. After the necessary code and data are written to the ACPI NVS, the processor goes into the sleep state, during which processor current consumption is reduced and the operation of the OS is suspended. While in the sleep state, the basic input/output system (BIOS) monitors the system for activity. When the BIOS detects activity, such as keyboard activity or some other input activity, the BIOS causes the processor to execute a resume process that causes the processor to exit the sleep mode and to use the information stored in the ACPI NVS to restore the processor to an active operation state.

Conventionally, there is a trusting relationship between the BIOS and the OS with respect to a resume operation. In particular, the resume information stored in the ACPI NVS is treated by the BIOS as being reserved and it is assumed that a post-boot agent did not attack or corrupt the ACPI NVS contents.

DETAILED DESCRIPTION

Although the following discloses example systems including, among other components, software or firmware executed on hardware, it should be noted that such systems are merely illustrative and should not be considered as limiting. For example, it is contemplated that any or all of these hardware and software components could be embodied exclusively in dedicated hardware, exclusively in software, exclusively in firmware or in some combination of hardware, firmware and/or software. Accordingly, while the following describes example systems, persons of ordinary skill in the art will readily appreciate that the examples are not the only way to implement such systems.

Figure 1:
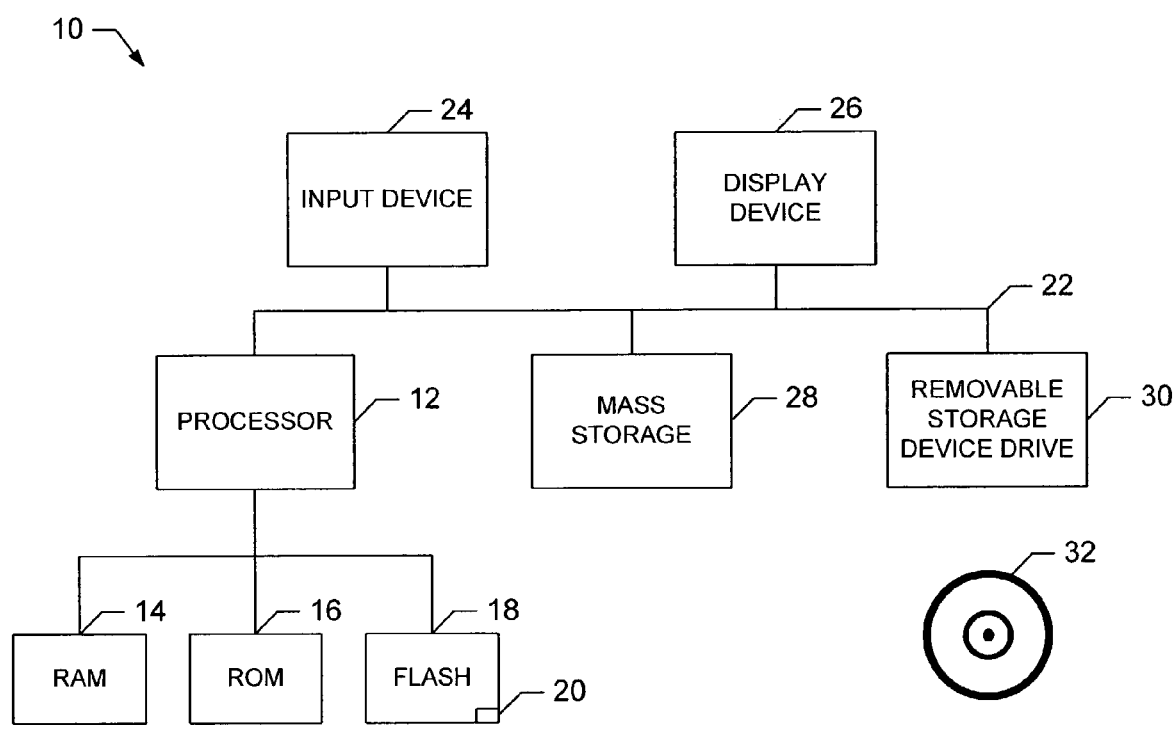
FIG. 1 is a diagram of an example processor system.

Turning now to FIG. 1, an example processor system 10 includes a processor 12 having associated system memory, such as a random access memory (RAM) 14, a read only memory (ROM) 16 and a flash memory 18. The flash memory 18 of the illustrated example includes a boot block 20. Further detail pertinent to the arrangement and mapping of the system memory is provided hereinafter in conjunction with FIG. 2.

The processor 12 is coupled to an interface, such as a bus 22 to which other components may be interfaced. In the illustrated example, the components interfaced to the bus 22 include an input device 24, a display device 26, a mass storage device 28 and a removable storage device drive 30. The removable storage device drive 30 may include associated removable storage media 32, such as magnetic or optical media.

The example processor system 10 may be, for example, a conventional desktop personal computer, a notebook computer, a workstation or any other computing device. The processor 12 may be any type of processing unit, such as a microprocessor from the Intel® Pentium® family of microprocessors, the Intel® Itanium® family of microprocessors, and/or the Intel XScale® family of processors.

The memories 14, 16 and 18 that are coupled to the processor 12 may be any suitable memory devices and may be sized to fit the storage demands of the system 10. In particular, the flash memory 18 is a low-cost, high-density, high-speed architecture having low power consumption and high reliability. The flash memory 18 is a non-volatile memory that is accessed and erased on a block-by-block basis.

The input device 24 may implemented by a keyboard, a mouse, a touch screen, a track pad or any other device that enables a user to provide information to the processor 12.

The display device 26 may be, for example, a liquid crystal display (LCD) monitor, a cathode ray tube (CRT) monitor or any other suitable device that acts as an interface between the processor 12 and a user. The display device 26 as pictured in FIG. 1 includes any additional hardware required to interface a display screen to the processor 12.

The mass storage device 28 may be, for example, a conventional hard drive or any other magnetic or optical media that is readable by the processor 12.

The removable storage device drive 30 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 32 is complimentary to the removable storage device drive 30, inasmuch as the media 32 is selected to operate with the drive 30. For example, if the removable storage device drive 30 is an optical drive, the removable storage media 32 may be a CD-R disk, a CD-RW disk, a DVD disk or any other suitable optical disk. On the other hand, if the removable storage device drive 30 is a magnetic media device, the removable storage media 32 may be, for example, a diskette or any other suitable magnetic storage media.

As described in detail hereinafter, the disclosed system enables the processor 12 to sleep (i.e., enter a low power state) and to awaken from the low power state and to test the integrity of information used by the processor 12 upon awakening before using such information to restore the processor 12 to an active operating state or mode. The low power state may be any one of the S1-S5 states defined by the ACPI specification. However, the disclosed system is particularly advantageous when used in conjunction with the S3 state. The disclosed functionality is imparted to the processor 12 through firmware or software instructions that are stored in one or more of the memories 14-16 and carried out by the processor 12.

Figure 2:
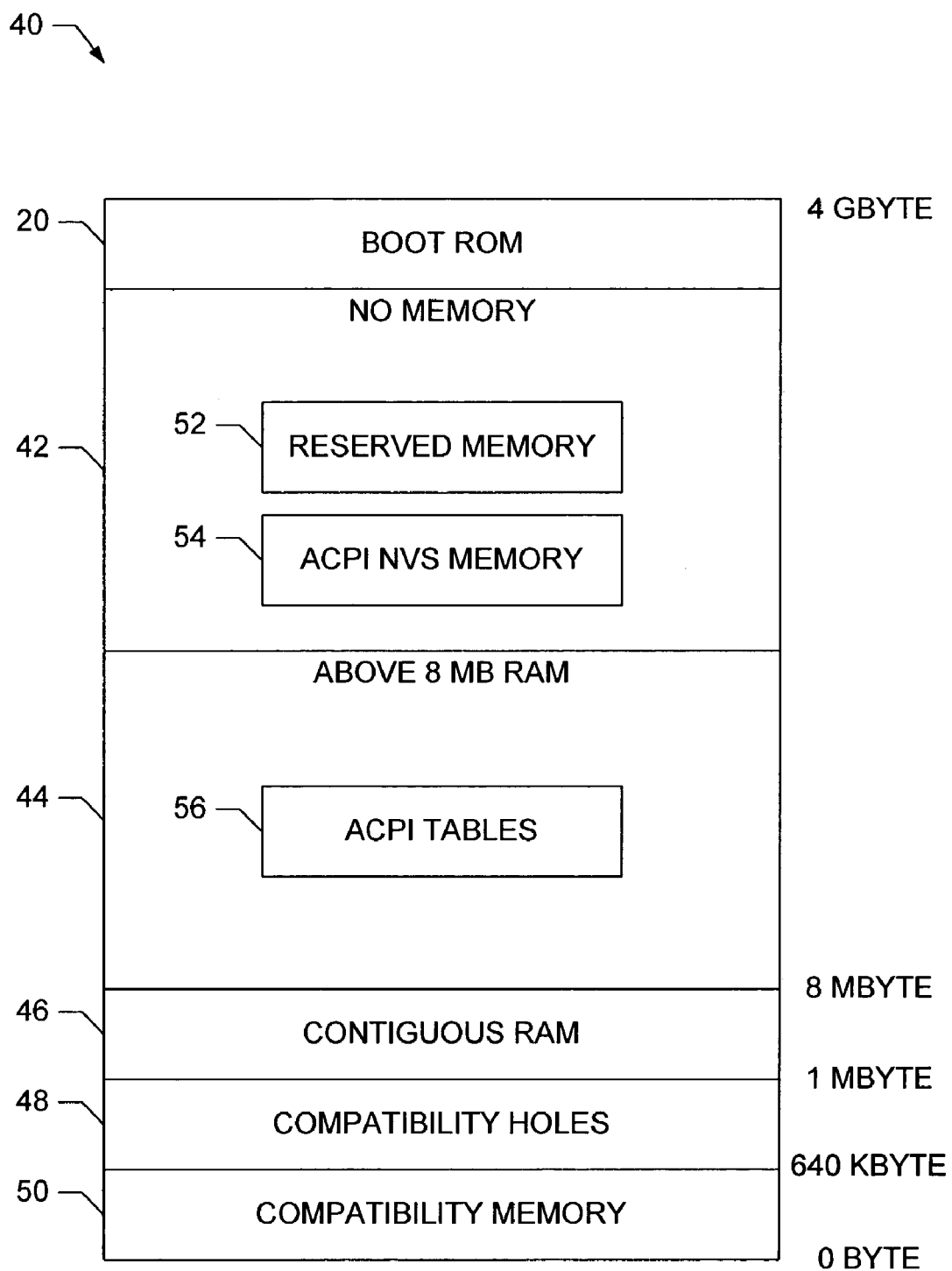
FIG. 2 is an example memory map of the system memory of FIG. 1.

As shown in the system memory map 40 of FIG. 2, system memory (e.g., the RAM 14, the ROM 16 and the flash memory 18) may be segmented into a number of portions 20, 42-50 by the processor 12. The memory map 40 of FIG. 2 corresponds to an Int15h, E820h interface described in the ACPI specification. In particular, portion 20 of the system memory map 40 corresponds to the boot block 20 described in conjunction with FIG. 1.

The portion 42 corresponds to available address space that also includes reserved memory 52 and ACPI NVS memory 54. The address space of portion 42 corresponds to memory locations that may be mapped by the processor 12 to communicate with another device, such as, for example, a device controller like a hard disk controller or any other device that may have, for example, a peripheral component interconnect (PCI). The ACPI NVS memory 54 is a portion of memory residing in RAM 14 that is available exclusively to the firmware BIOS of the processor 12. The ACPI NVS memory 54 may not be reclaimed by any OS that the processor 12 executes.

The portion 44 is formed from memory above 8 megabytes (MB) and includes ACPI tables 56. The memory above 1 MB, but below 8 MB, which defines portion 46, is system memory that is used as contiguous RAM. The portion 48 above 640 kilobytes (KB), but below 1 MB is defined to be available address space defining compatibility holes and the portion 50 of memory below 640 KB is system memory used as compatibility memory.

While the foregoing describes memory allocation as defined by E820h, those having ordinary skill in the art will readily recognize that other memory maps may be used. For example, the "EFI GetMemoryMap ()" service, as defined in chapter 3.2.3 of the Extensible Firmware Interface (EFI) Specification, Versions 1.02 and 1.10, is one additional technique by which memory usage may be ascertained. Additional information pertinent to the EFI specification is available at http://developer.intel.com/technology/efi.

Figure 3:
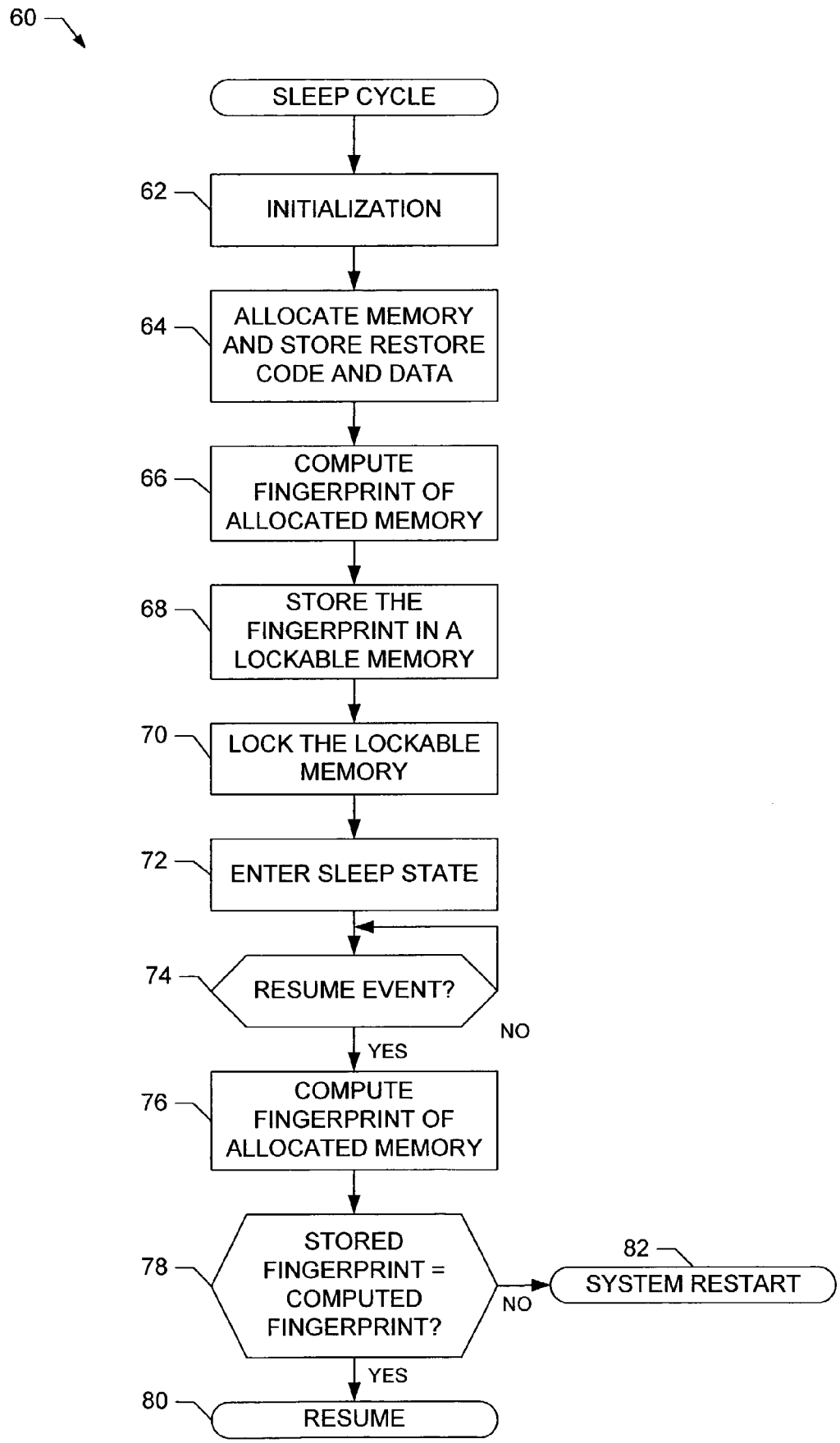
FIG. 3 is a flow diagram of an example start/power-on process.

FIG. 3 illustrates on example of a sleep cycle process 60 that may be implemented in firmware or software stored in system memory (e.g., memories 14-18) and executed by the processor 12. Although those having ordinary skill in the art will readily appreciate the details of the various processor sleep states, a brief description of each sleep state is provided for convenience. The S1 sleep state is a low wake latency sleeping state. In the S1 state, no system context is lost in either the processor or any associated processor chip set and hardware maintains all system context.

The S2 sleep state is similar to the S1 sleep state, except that in the S2 sleep state, the processor and system cache context is lost; the OS is responsible for maintaining the caches and the processor context. When a wake event is detected by a processor that is in an S2 sleep state, the processor begins execution from the processor's reset vector.

The S3 sleep state is a low wake latency sleeping state in which all system context is lost, except system memory. The processor, cache, and chip set contexts are lost in this state. However, hardware maintains a memory context and restores some processor and other configuration contexts. As with the S2 sleep state, control starts from the processor's reset vector after the wake event.

The S4 sleep state is the lowest power, longest wake latency sleeping state supported by ACPI. To reduce power consumption to a minimum, it is assumed that the hardware platform has powered off all devices in the S4 sleep state. Platform context is maintained.

The S5 sleep state is similar to the S4 sleep state except that the OS does not save any context. The system is in the "soft" off state and requires a complete boot when it wakes. Software uses a different state values to distinguish between the S5 state and the S4 state to allow for initial boot operations within the BIOS to distinguish whether or not the boot is going to wake from a saved memory image.

Returning to FIG. 3, at the commencement of the sleep cycle process 60, the processor 12 initializes a firmware platform and various registers that are used by the processor 12 (block 62). The processor 12 proceeds to allocate memory for code and data that will be used by the processor 12 when the processor 12 restores its operation from a sleep state and stores the restore code and data in the allocated memory (block 64). The allocated memory may be in any one of the RAM 14, the ROM 16 or the flash memory 18 (FIG. 1). In particular, the allocated memory may be the ACPI NVS memory 54 (FIG. 2). Alternatively, the allocated memory could be located on the mass storage 28 (FIG. 1) or on any other storage device to which the processor 12 has access.

After the restore code and data have been written to the allocated memory, the processor 12 computes a fingerprint of the allocated memory (block 66). As will be readily appreciated by those having ordinary skill in the art, the fingerprint may be calculated by the processor 12 or another peripheral, such as, for example, a trusted processor module (not shown) or a cryptography co-processor (not shown). The fingerprint may be computed using any one of a number of different algorithms, such as, for example, a one way hash according to SHA-1/256/512 or MD4/5. Alternatively, the fingerprint may be calculated using a public or private key or a key embedded in the processor 12 or any co-processor (not shown). The fingerprint is then stored in a lockable memory (block 68) and the lockable memory is locked by the processor 12 (block 70). The lockable memory may be in RAM 14. For example, the fingerprint may be stored in the reserved memory 52 (FIG. 2) or the ACPI NVS memory 54 (FIG. 2). Alternatively, the fingerprint may be stored in the flash memory 18.

At this point in the sleep cycle process 60, the processor 12 may proceed to carry out other functions, such as booting an OS, or the like. At some point in time, however, an event will cause the processor 12 to enter a sleep state (e.g., one of S1-S5 states) (block 72). Events that cause the processor 12 to enter a sleep state may include, but are not limited to, system inactivity, closing a cover on a notebook computer or the occurrence of any other event that, in a manner known to those having ordinary skill in the art, causes the processor 12 to realize it is not being utilized and, therefore, can be put in a power saving mode having a reduced current drain.

While the processor 12 is in the sleep state, the processor 12 monitors the system 10 for the occurrence of an event that will cause the processor 12 to awaken (block 74) and resume an active operating state. An event that causes the processor 12 to awaken is commonly referred to as a resume event, because the processor 12 will resume its normal awake state of operation in response to the detected event. Resume events may include, but are not limited to, depressing a power button, opening a lid of a notebook computer or any other suitable event after which it would make sense to resume normal awake processor operation. The processor 12 will remain in the sleep state until a resume event is detected (block 74).

Upon detection of a resume event (block 74), the processor 12 re-computes the fingerprint of the allocated memory (block 76), which is the portion of memory in which the resume code and data were stored, as described in conjunction with block 64.

The processor 12 compares the fingerprints calculated as described in conjunction with blocks 66 and 76 to determine if such fingerprints match (block 78). If the fingerprints match, there is a very low probability that the restore code and data has been altered. Accordingly, the processor 12 can proceed with resuming from the sleep state (block 80) to an active state of operation. Conversely, if the fingerprints do not match (block 78), there is a high probability that either the restore code or the restore data has been altered. Because an alteration in the restore code or the restore data affects the manner in which the restore will be carried out, the processor 12, upon determining that the fingerprints do not match, will carry out a system restart (block 82). Non-matching fingerprints may be the result of an errant kernel-mode OS driver or a result of a malicious agent attempting to usurp the restore process (e.g., attempting to have the BIOS resume to code implementing a virus, as opposed to returning to the operating system power-management agent). Because a system restart does not rely on the restore code or the restore data, there is little probability that the alteration to the restore code or data will affect processor 12 operations after the system restart (block 82).

While the foregoing describes an example process of fingerprinting and verifying memory contents, this is merely one example of the general technique of fingerprinting and verifying information that will be used during a resume. Fingerprinting and verification may be carried out on resume information stored in any desirable location. For example, information stored in PCI configuration space, which is a hardware location in chipsets and devices that contains control status register information, could be fingerprinted and later verified. Additionally or alternatively, other input/output (I/O) resources, complimentary metal oxide semiconductor (CMOS) devices, electrically erasable programmable read only memories (EEPROMS) and other resources that may be complicit in resume activities may be fingerprinted and verified before a resume is carried out.

Although certain apparatus constructed in accordance with the teachings of the invention have been described herein, the scope of coverage of this patent is not limited thereto. On the contrary, this patent covers all apparatuses, methods and articles of manufacture of the teachings of the invention fairly falling within the scope of the appended claims either literally or under the doctrine of equivalents.

What is claimed is:

1. A method of securely resuming operation of a processor from an S3 state to an active state, the method comprising:
   allocating a portion of a memory for storing information used to resume operation from the S3 state to the active state;
   storing in the allocated portion information used to resume operation from the S3 state to the active state;
   calculating a first metric of the allocated portion using a cryptography co-processor;
   storing the first metric in a lockable memory;
   entering the S3 state of operation;
   detecting a resume event;
   calculating a second metric of the allocated portion;
   comparing the first metric to the second metric;
   resuming operation from the S3 state to the active state if the first metric and the second metric match; and
   carrying out a system restart if the first metric and the second metric do not match.

2. The method as defined by claim 1, wherein the first metric includes a hash of the information stored in the allocated portion.

3. The method as defined by claim 2, wherein the second metric includes a hash of the information stored in the allocation portion.

4. An article comprising a machine-accessible medium having a plurality of machine accessible instructions that, when executed, cause a machine to:
   allocate a portion of a memory for storing information used to resume operation from an S3 state to an active state;
   store in the allocated portion information used to resume operation from the S3 state to the active state;
   calculate a first metric of the information stored in the allocated portion using a cryptography co-processor;
   store the first metric in a lockable memory;
   enter the S3 state of operation;
   detect a resume event;
   calculate a second metric of the information store in the allocated portion;
   compare the first metric to the second;
   resume operation from the S3 state to the active state if the first metric and the second metric match; and
   carry out a system restart if the first metric and the second metric do not match.

5. The article as defined by claim 4, wherein the first metric includes a hash of the information stored in the allocated portion.

6. The article as defined by claim 5, wherein the second metric includes a hash of the information stored in the allocation portion.

7. A system comprising:
   a lockable memory storing a first metric;
   a cryptography co-processor to calculate a second metric of information stored in the memory, wherein the information is used to resume operation from an S3 state to an active state;

a processor coupled to the memory, wherein the processor is configured to:
  enter the S3 state;
  detect a resume event that causes the processor to awaken from the S3 state and to enter the active state; and
  compare the second metric to the first metric;
  resume operation from the S3 state to the active state if the first metric and the second metric match; and
  carry out a system restart if the first metric and the second metric do not match.

8. The system as defined by claim 7, wherein the first and second metrics include hashes of the memory.

9. The system as defined in claim 7, wherein entering the S3 state comprises maintaining a memory context.

* * * * *